United States Patent
Mohamed Shibly et al.

(10) Patent No.: US 11,377,945 B2
(45) Date of Patent: Jul. 5, 2022

(54) METHOD FOR AUTOMATED CRACK DETECTION AND ANALYSIS USING ULTRASOUND IMAGES

(71) Applicant: Saudi Arabian Oil Company, Dhahran (SA)

(72) Inventors: Kaamil Ur Rahman Mohamed Shibly, Al-Khobar (SA); Ahmad Aldabbagh, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 315 days.

(21) Appl. No.: 16/861,430

(22) Filed: Apr. 29, 2020

(65) Prior Publication Data

US 2021/0340857 A1    Nov. 4, 2021

(51) Int. Cl.
*E21B 47/002* (2012.01)
*G06T 7/00* (2017.01)
*G06N 20/00* (2019.01)
*G06N 3/08* (2006.01)

(52) U.S. Cl.
CPC ........... *E21B 47/002* (2020.05); *G06N 3/084* (2013.01); *G06N 20/00* (2019.01); *G06T 7/0002* (2013.01); *G06T 7/97* (2017.01); *G06T 2207/10132* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 7,215,811 B2 | 5/2007 | Moselhi et al. | |
| 7,480,574 B2 | 1/2009 | Dubois et al. | |
| 8,746,070 B2 | 6/2014 | Tippit et al. | |
| 9,949,717 B2 | 4/2018 | Rozental et al. | |
| 9,970,905 B2 | 5/2018 | Volker et al. | |
| 2018/0260720 A1 | 9/2018 | Wu et al. | |

(Continued)

OTHER PUBLICATIONS

Amaya-Gomez Rafael et el., "Pattern recognition techniques implementation on data from In-Line Inspection (ILI)", Journal of Loss Prevention in the Process Industries, vol. 44, p. 735-747, Jul. 25, 2016.

(Continued)

*Primary Examiner* — Frank S Chen
(74) *Attorney, Agent, or Firm* — Leason Ellis LLP

(57) ABSTRACT

A computer-based method and system for predicting the propagation of cracks along a pipe is provided, wherein successive time-indexed ultrasound images of a pipe surface are captured and digitized. A computer vision algorithm processes the images to identify defects in the pipe, including cracks. At least one blob detection module is used to identify groups of cracks on the pipe surface that have created detectable areas of stress concentration or a prescribed likelihood of crack coalescence or crack cross-influence. The center locations and radial extents of respective blobs are each parametrized as a function of time and pipe surface location by determining parity relationships between successive digital data sets from successive captured images. The determined parity relationships are then used as training data for a machine learning process to train a system implementing the method to predict the propagation of cracks along the pipe.

18 Claims, 7 Drawing Sheets

(56) References Cited

U.S. PATENT DOCUMENTS

| | | |
|---|---|---|
| 2018/0300639 A1 | 10/2018 | Abbas |
| 2019/0019589 A1 | 1/2019 | Waite |
| 2019/0049411 A1* | 2/2019 | Kannajosyula .... G01N 29/2437 |
| 2019/0161919 A1 | 5/2019 | Gilbert |
| 2019/0185186 A1* | 6/2019 | Li ........................ G06V 10/757 |
| 2021/0056678 A1* | 2/2021 | Al Shehri ................ G06N 3/08 |

OTHER PUBLICATIONS

Mingjiang Xie et al., "A review on pipline integrity management utilizing in-line inspection data," Engineering Failure Analysis, vol. 92., p. 222-239, Oct. 1, 2018.

* cited by examiner

METHOD FOR AUTOMATED CRACK DETECTION AND ANALYSIS USING ULTRASOUND IMAGES

FIELD OF THE DISCLOSURE

This patent application relates to methods for using ultrasound images to detect cracks in petroleum reservoir pipes, and, more particularly, to methods for predicting the propagation and potential merger of cracks along pipes through machine learning-enabled analysis of successive high-resolution ultrasound images of a pipe's condition.

BACKGROUND OF THE DISCLOSURE

Petroleum extraction is an endeavor in which the tools and machinery used as part of the process are exposed to extreme environments. A viscous, caustic fluid is extracted from below, oftentimes far below, the earth's surface under conditions of high pressure. The downhole geological conditions that are encountered in the process of petroleum extraction place enormous engineering stresses on the equipment involved. These include high-amplitude, cyclic pressure loads which, combined with the highly corrosive environment, will gradually lead to the generation and eventual propagation of cracks in system pipes, ultimately posing a high risk of catastrophic failure of such pipes.

The incidence of cracks in the pipes of a hydrocarbon extraction and processing system is a process that begins insidiously, beginning when small defects in the microstructure of a pipe appear and initiate a process whose ultimate result is the dangerous undermining of the pipe's structural integrity. This erosive damage is often attributable to a chemical process called hydrogen embrittlement, or hydrogen-induced cracking, which is the process of embrittlement of a metal after its exposure to hydrogen. The phenomenon of hydrogen embrittlement is not entirely well-understood, although theories have been advanced to explain the process. Theories proposed include that the exposure of a metal surface to hydrogen causes brittle hydrides to form within certain metals, resulting in the emergence of voids leading to bubbles and pressure build-up within a material, or even a hydrogen-induced enhanced decohesion of the material with resulting plasticity that promotes in the propagation of cracks.

Regardless of the actual mechanism that results in embrittlement of the material, chronic hydrogen exposure such as that seen in the petroleum industry clearly has a deleterious effect on the materials used to conduct the raw petroleum being extracted. Over time, cracks can develop throughout the structure of oil pipelines, resulting in the structure becoming so compromised that the threat of a sudden, catastrophic failure, becomes a real possibility. The losses attendant to such an event can be monumental, owing first to the cessation of production operations and then to the costs of remediation and repair, which may even include casualties among personnel and ancillary equipment.

The existence of the threat that hydrogen poses to petroleum extraction and production operations dictates that vigilance is needed, with operators of petroleum enterprises taking proactive measures to spot burgeoning cracks and other defects so that remediation and repair can be accomplished well before a catastrophic failure occurs and large-magnitude losses are incurred. Given the sheer physical scale of the typical petroleum extraction and production operation, as well as limits of human observation and endurance, automated solutions to the problem of pipe crack detection have been developed.

A popular and successful solution uses pipeline "crawlers," which are semi-autonomous vehicles that traverse the surfaces of pipes using one or more of several types of sensors that are available for use in scanning the microstructure of pipes to detect defects such as cracks. The crawlers are typically self-propelled, and they can accomplish locomotion in a variety of ways. A crawler can include tank-like tracks and follow a user-controlled or computer-controlled course rolling alongside the pipe. Alternatively, a crawler can be attached to a track that follows the path of the pipeline, with the crawler propelling itself along the track as it scans the nearby surface of the pipe. Certain crawlers can even accomplish locomotion along the surface of the pipe itself, with the crawler in such arrangements coupled to the pipe by magnetic wheels while the attached sensor does its job scanning the pipe's surface.

Even though the image capture process is automated, the task of identifying cracks in the images obtained is daunting in both magnitude and analytical difficulty. Even with the highest-quality ultrasound imagery available, a human reader of the images will be hard-pressed to make identifications of all but the most obvious, i.e., advanced and dangerous, cracks present within the surface of the pipe.

It is with respect to this background that the present disclosure is addressed.

SUMMARY OF THE DISCLOSURE

The present disclosure provides a method and system whereby time-lapsed high-resolution ultrasound images obtained either by remote sensing equipment or by manual field measurements are presented to a machine learning-enabled system to determine correlations that can be used in future analyses to make predictions as to a pipe's longevity and when remediation measures need to be taken. In an embodiment, the steps of the method of the present disclosure can be implemented as a plurality of processes running on at least one processor connected to at least one memory.

In an embodiment in accordance with aspects of the disclosure, a plurality of ultrasound images of at least one area of interest on a surface of the pipe are captured, wherein each image is indexed to a position and time of the image capture. The captured images are preprocessed using a computer vision algorithm running on a processor, wherein the preprocessing operates on digitized data defined from each captured image and wherein the algorithm is configured to identify defects in the pipe, including cracks, based on the preprocessing of the digitized data. Each crack that is identified is associated with a unique identifier by a process running on the processor, the unique identifier to be used thereafter by the method and system to track individual cracks. Blobs within the digitized data defined from each captured image are identified using at least one blob detection module running on the processor. Blobs comprise groups of cracks that are correlated by the blob detection module as having detectable areas of stress concentration or a prescribed likelihood of crack coalescence or crack cross-influence.

A method in accordance with the foregoing aspects of the disclosure proceeds by using a process running on the processor to parametrize a location of a center of each identified blob as a function of time, and then by using a process running on a processor to parametrize a radial extent of each blob as a function of time relative to the center of each blob. The parametrized blob locations and radial extents are correlated by a process running on the processor to determine parity relationships for each blob from one digital data set from a first captured image to a next digital data set from a next captured image over a blob life cycle. A process running on the processor can then use the determined parity relationships to determine parameters indicative of the state of the pipe surface, such as the defect area ratio, the gross number of cracks, and crack propagation rates. A system implementing the disclosed method can be trained to predict the propagation of cracks along a pipe using the determined parity relationships as training data for a machine learning process running on the processor.

In an embodiment in accordance with the disclosure, the machine learning process comprises using an algorithm to process the training data. In an alternative embodiment, the machine learning process comprises training a neural network using the training data.

In an embodiment in accordance with the disclosure, the at least one blob detection module implements blob detection methods selected from the group consisting of: Laplacian of Gaussian, Difference of Gaussian, and Determinant of Hessian. In a further embodiment, the method comprises iteratively varying the parameters and weights used as inputs to the at least one blob detection module until a desired degree of agreement is achieved between crack propagation predictions and measured crack data.

In an embodiment in accordance with the disclosure, the method comprises providing the determined parity relationships of at least one blob to a visualization program to generate detailed static or time-lapsed images of the blob.

In an embodiment in accordance with the disclosure, the method comprises using the determined parity relationships of at least one blob to generate and present a summary of all blob parametric data, comprising: blob center translational history, blob radial extents as a function of time and position, and propagation rates of the blob over its life cycle.

In an embodiment in accordance with the disclosure, a system for predicting the propagation of cracks along a pipe can be constructed to implement one of more of the steps utilized by any of the foregoing methods, by employing at least one processor which connected to at least one memory, with such steps being executed or otherwise running on the processor.

These and other features, aspects, and advantages can be appreciated from the following description of certain embodiments in accordance with the present disclosure.

BRIEF DESCRIPTION OF THE DRAWINGS

The accompanying drawing figures illustrate exemplary embodiments and are not intended to be limiting of the present disclosure. Among the drawing figures, like references are intended to refer to like or corresponding parts.

DETAILED DESCRIPTION OF CERTAIN EMBODIMENTS ACCORDING TO THE DISCLOSURE

The present disclosure concerns a method and system that can be used to analyze crack formations and predict the propagation of cracks on the surface of a pipe that have been identified by ultrasonography.

Figure 1:
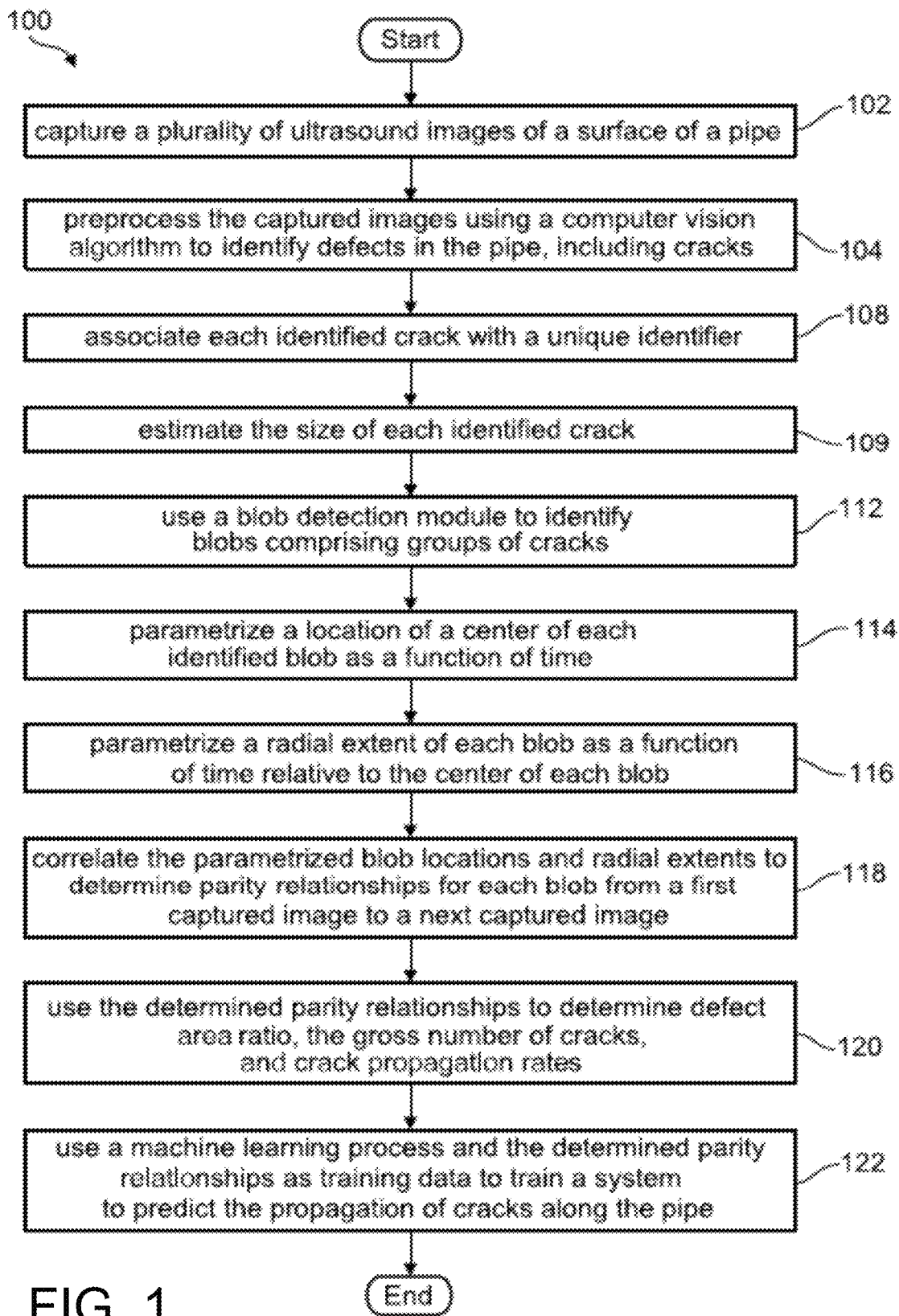
FIG. 1 illustrates a flow diagram of a method according to the present disclosure.
Figure 2A:
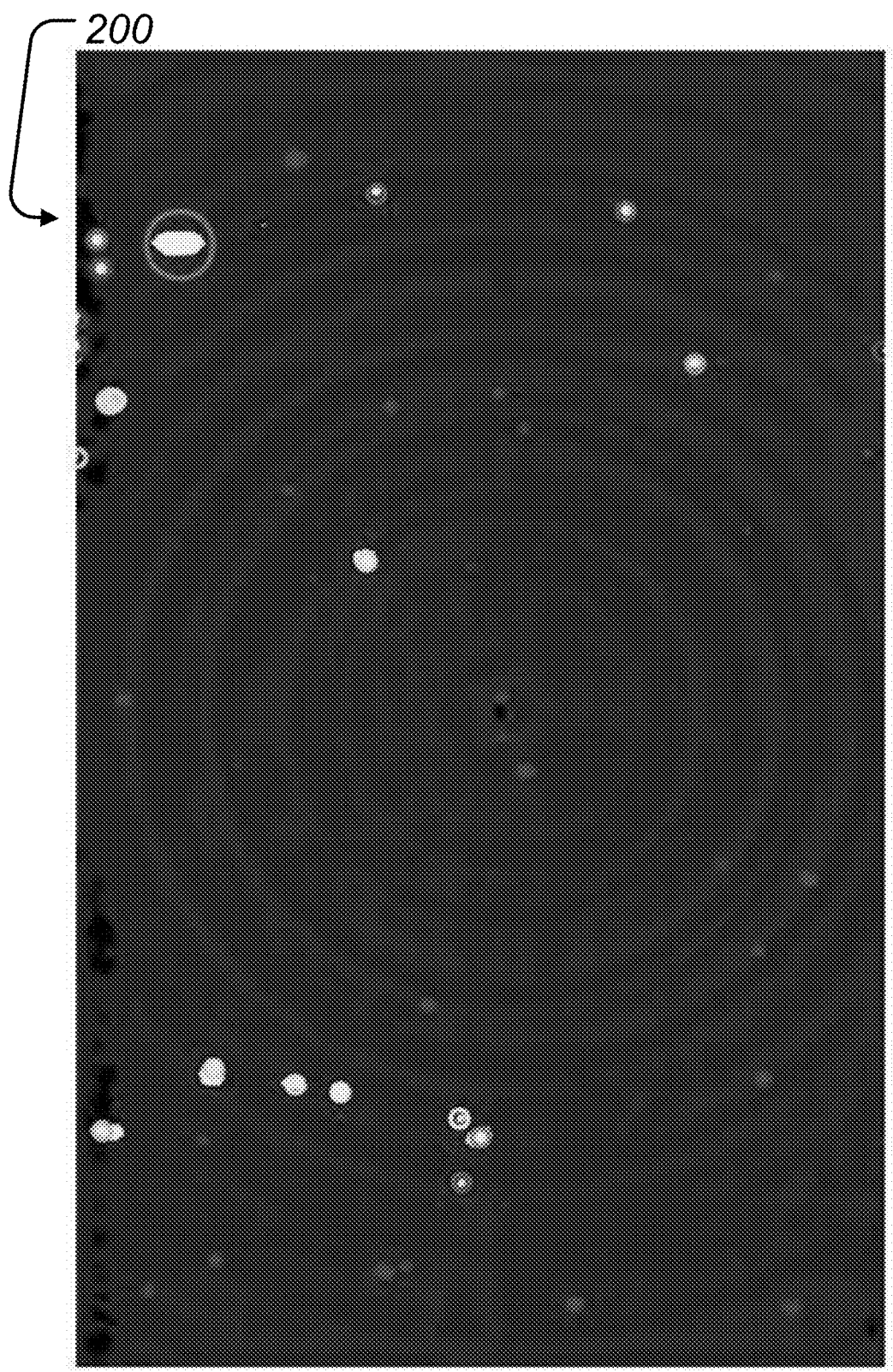
FIGS. 2A and 2B illustrate two exemplary ultrasound images of an area of a pipe's surface that can be processed by the method according to the present disclosure.
Figure 2B:
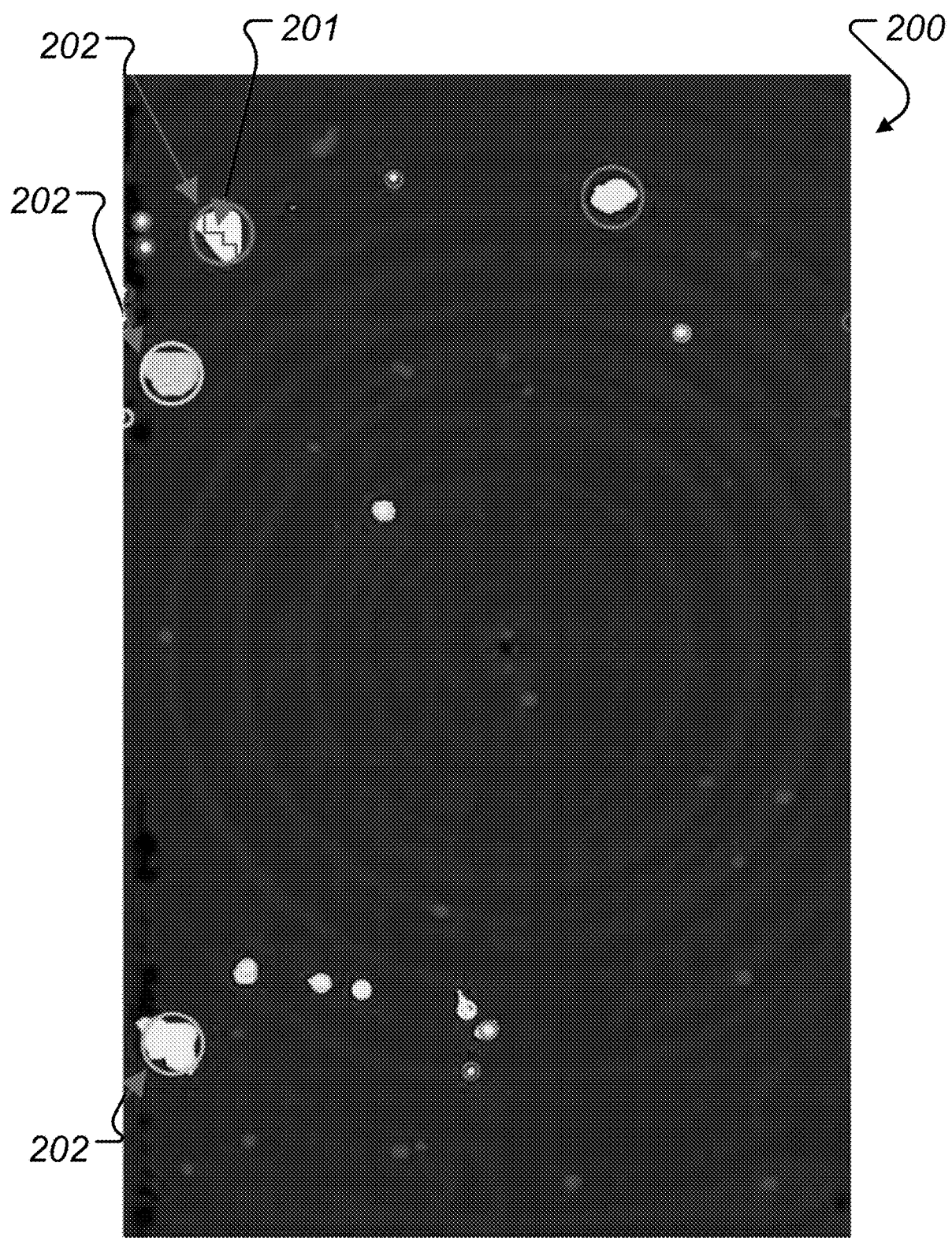

The method 100 of the present disclosure, which is shown schematically in FIG. 1, begins in step 102 by capturing a plurality of ultrasound images of at least one area of interest on a surface of the pipe. FIGS. 2A and 2B show two examples of ultrasound images 200 obtained by scanning selected areas of a surface of a pipe. Each of the two images reveal the presence of multiple blobs 202, which include areas where cracks or other defects 201 present within the surface of the pipe have created areas of detectable stress concentration. As each image is captured, it is indexed to the time and the position along the surface of the pipe at which the image was captured. Any suitable or convenient coordinate system can be used to record the exact position data corresponding to respective ultrasound images. For example, precise GPS position data can be used if available and desired for use by algorithms that process the data. On the other hand, a user or enterprise may wish to define a coordinate system with respect to the piping system under study. In this case, a Cartesian coordinate system can be used to describe various positions along the surface of the pipe, with all positions defined with respect to a selected point of origin within the piping system. Alternatively, a cylindrical coordinate system can be defined for the piping system, wherein a suitable point of origin is selected and positions on the surface of the pipe are then described by an axial displacement along the centerline length of the pipe, a radial distance from the centerline, and an angular position or azimuth defined with respect to a reference. This data, in conjunction with the visual data itself that has been captured, will be used by the disclosed method and apparatus to make predictions of the likely propagation over time of any identified cracks.

Figure 3A:
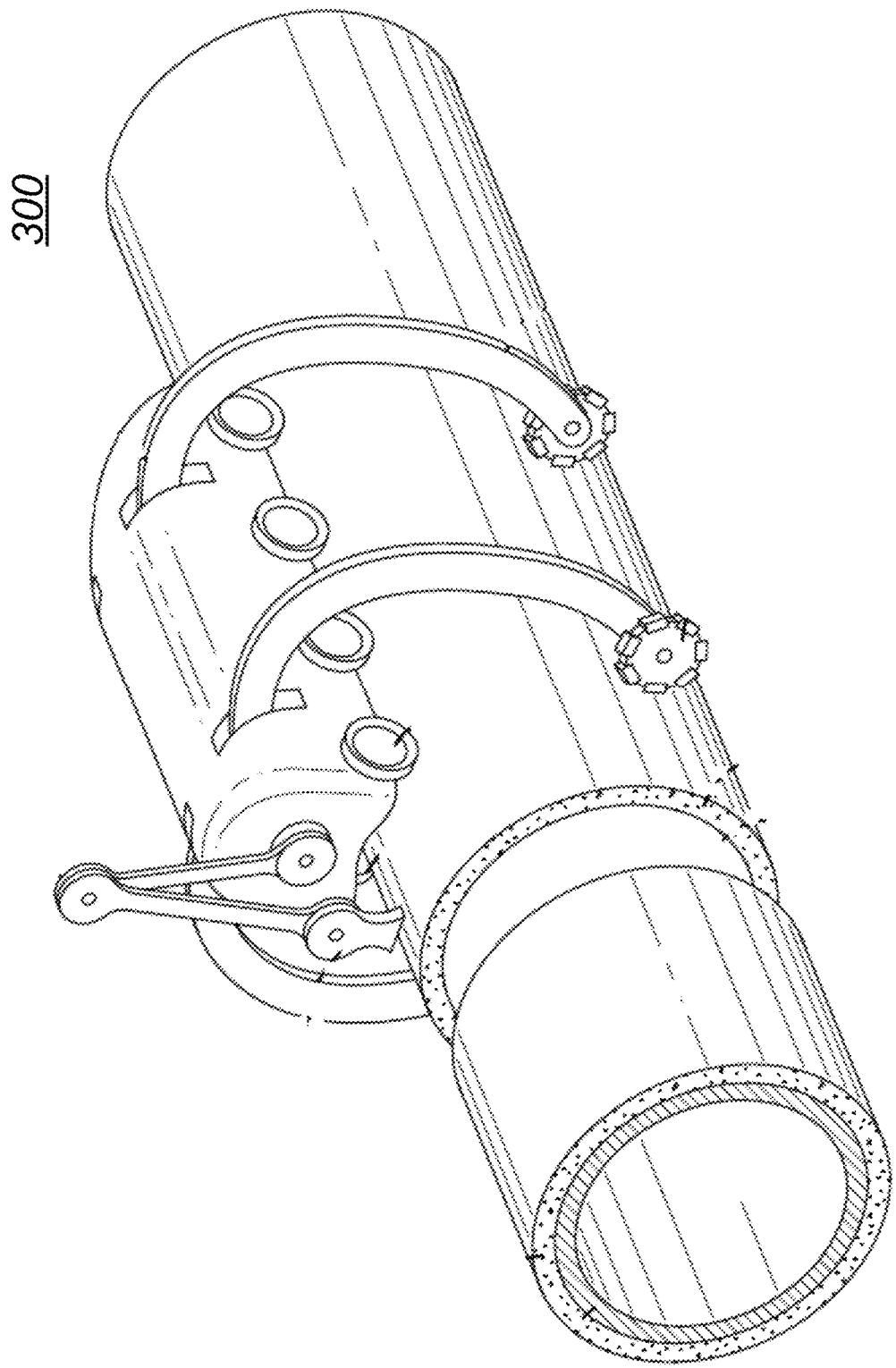
FIGS. 3A and 3B illustrate exemplary embodiments of an ultrasound-enabled crawler operating along the surface of a pipe to obtain the ultrasound images used by a method and system implementing the present disclosure.
Figure 3B:
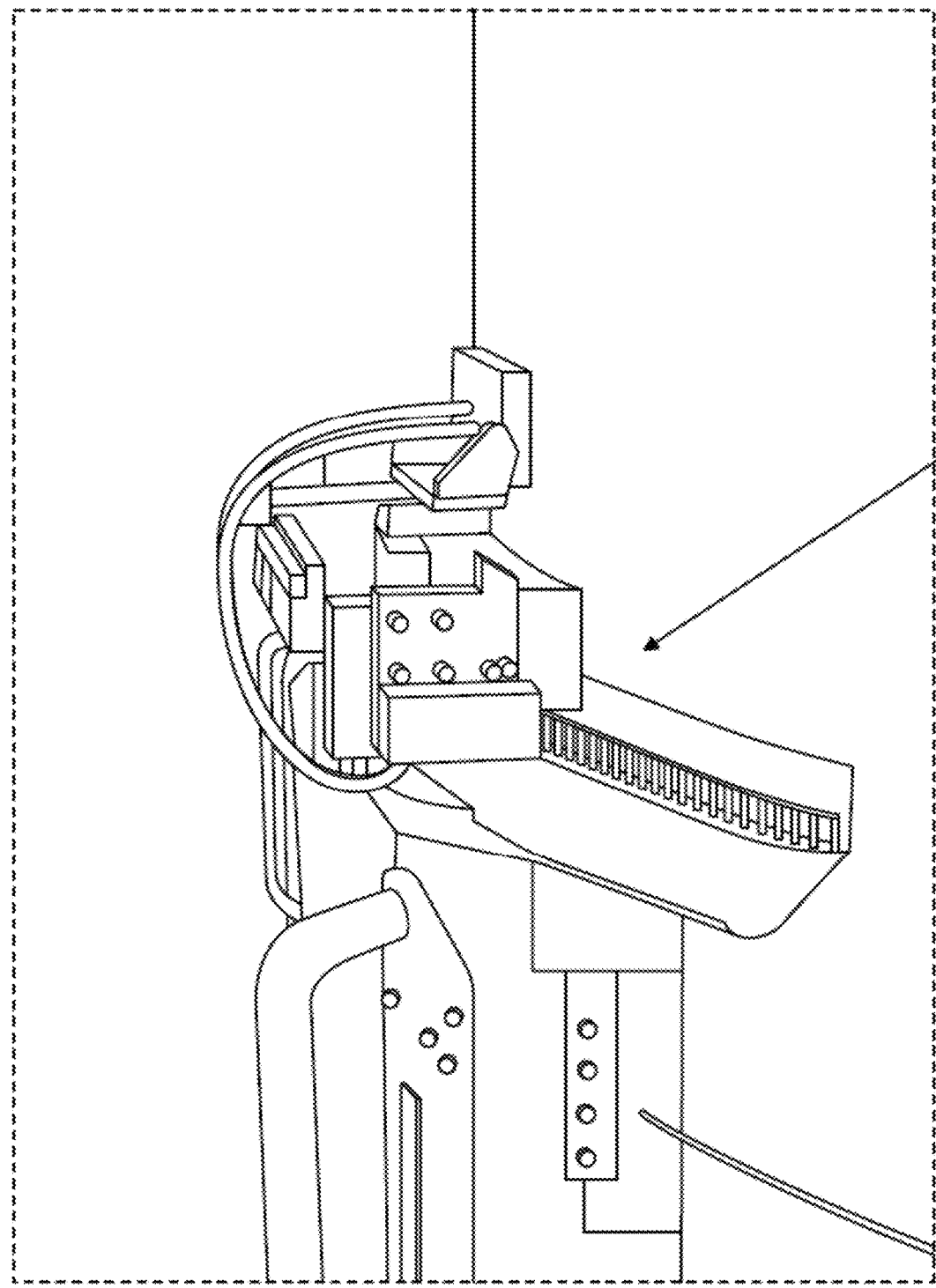

FIGS. 3A and 3B show two non-limiting examples of an inspection crawler 300 that can be used to obtain the ultrasound images to be used in practicing the disclosure. As seen in FIG. 3A, the crawler 300 can include, for example, the inspection crawler 102 described in U.S. Pat. No. 10,589,433, titled "Underwater Pipeline Inspection Crawler," the entirety of which is incorporated herein by reference. The crawler 300 can include an image sensor device (not shown) that can capture ultrasound images or scans of the surface of the pipe as the drawler 300 moves along the surface. The use of an ultrasound sensor-enabled crawler is only one of many possible solutions for obtaining the ultrasound imagery to be used by the present disclosure. Any other practical arrangement, including a hand-held ultrasonic scanner directed at an area of interest on a pipe, can be used to obtain the ultrasound images used in practicing the disclosure. The crawler has magnetic wheels that keep it affixed to the surface of the pipe as it scans, and its on-board motor propels the chassis and associated apparatus, including the attached ultrasound scanner, along the surface of the pipe as it obtains the ultrasound imagery which will then be used by the present method and system to detect cracks in the pipe under study and make predictions of crack propagation. The crawler can follow a preprogrammed course of travel over the surface of the pipe. Depending on the extent of the piping under study and the operating speed of the crawler, the crawler can be programmed either to cover a length of the subject pipe, a representative sample area of the pipe, or an area that is of concern because of known extreme operating conditions or even visible signs of wear on the pipe. Alternatively, the action of the crawler can be orchestrated by a human operator who provides the control inputs that direct the crawler to traverse and scan pipe areas of interest.

After the ultrasound images of the pipe area of interest have been obtained, the next step 104 of the disclosed method 100 is preprocessing the captured ultrasound images 200 by, for example, a computer vision unit 406 (shown in FIG. 4), which can be configured by software executing in a processor 402 (shown in FIG. 4) to preprocess the images 200 in preparation for making crack propagation determinations using them.

Figure 4:
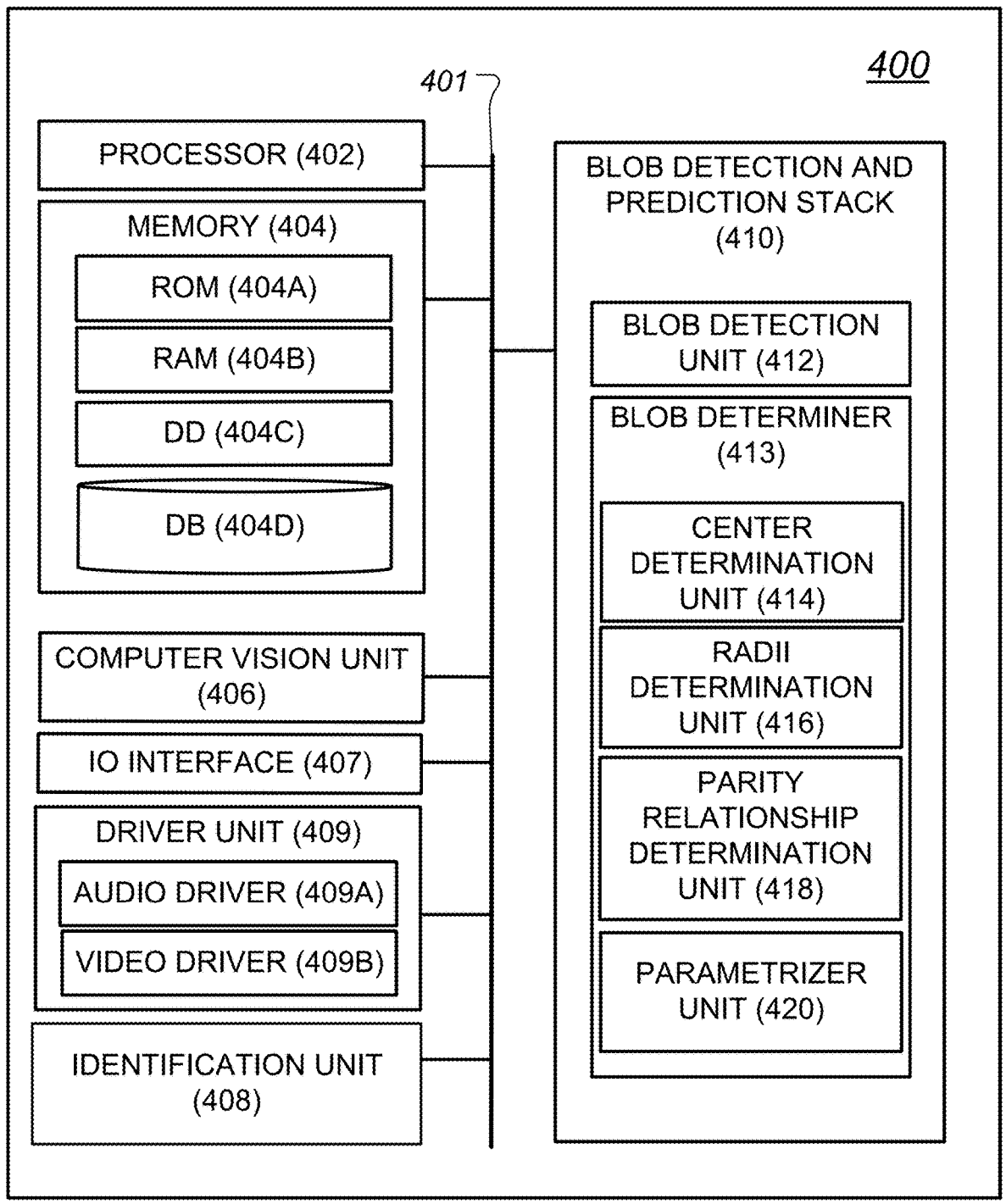
FIG. 4 illustrates an embodiment of a system according to the present disclosure in which individual processes are shown running on a processor connected to a memory.

FIG. 4 shows an embodiment of a system 400 implementing the present method, wherein the system comprises at least one processor 402 connected to at least one memory 404. The system 100 includes the computer vision unit 406, an input-output (IO) interface 407, an identification unit 408, a driver unit 409, and a Blob Detection and Prediction (BDP) stack 410, all of which can interconnect to a bus 401 via a communication link. Although shown as separate computer resource assets in FIG. 4, the computer vision unit 406 or identification unit 408 can be included in the BDP stack 410. The BDP stack 410 can include a blob detection unit 412 and a blob determiner 413. The blob determiner 413 includes a blob center determination unit 414, a blob radii determination unit 416, a parity relationship determination unit 418, and a parametrizer unit 420. Any one or more of the computer resource assets 404 to 420 can include a computing device or a computing resource that is separate from the processor 402, as seen in FIG. 4, or integrated or integrateable or executable on a computing device such as the processor 402.

The BDP stack 410 includes a plurality of computing resource assets that can build a blob model, and that can identify and predict blobs in a pipe, generating the blob model such that it can render or cause a display device (not shown) to render an image of a blob on the pipe over its life cycle, from formation of an initial crack to the development and progression of a resultant blob. The computer resource assets can include one or more machine learning platforms or algorithms, including, for example, an artificial neural network (ANN), a convolutional neural network (CNN), a deep CNN (DCNN), a recurrent CNN (RCNN), a Mask-RCNN, a deep convolutional encoder-decoder (DCED), a recurrent neural network (RNN), a neural Turing machine (NTM), a differential neural computer (DNC), a support vector machine (SVM), or a deep learning neural network (DLNN). The BDP stack 410 can analyze image data, detect cracks or defects in the images, identify and classify each crack or defect, track or monitor the cracks or defects over time and predict blobs over their entire life cycles, including the position, size, shape, and spatial orientation of each crack, defect or blob as a function of time. The BDP stack 410 can build or update a model for each crack or blob and predict crack or blob formations as a function of time, and, through interaction with the driver 409, render simulations of crack or blob formations on a display device (not shown) from formation through propagation of each crack or blob.

The processor 402 can include any of various commercially available computing devices, including for example, a central processing unit (CPU), a graphic processing unit (GPU), a general-purpose GPU (GPGPU), a field programmable gate array (FGPA), an application-specific integrated circuit (ASIC), a manycore processor, multiple microprocessors, or any other computing device architecture can be included in the processor 402.

The memory 404, including non-transitory computer-readable storage media, can provide nonvolatile storage of data, data structures, and computer-executable instructions. The memory 404 can accommodate the storage of any data in a suitable digital format. The non-transitory computer-readable storage medium can include computer executable code or instructions that, when executed by, for example, the processor 402, can cause the system 400 to perform each of the steps shown in FIG. 1. The memory 404 can include one or more computing resources such as, for example, program modules or software applications that can be used to execute aspects of the architecture included in this disclosure. The memory 404 can include a read-only-memory (ROM) 404A, a random-access-memory (RAM) 404B, a disk drive (DD) 404C, or a database (DB) 404D.

A basic input/output system (BIOS) can be stored in the non-volatile memory 404A, which can include a ROM, such as, for example, an erasable programmable read-only memory (EPROM), an electrically erasable programmable read-only memory (EEPROM) or another type of non-volatile memory. The BIOS can contain the basic routines that help to transfer information between the computer resource assets in the system 400, such as during start-up.

The RAM 404B can include a high-speed RAM such as static RAM for caching data. The RAM 404B can include, for example, a static random access memory (SRAM), a dynamic random access memory (DRAM), a synchronous DRAM (SDRAM), a non-volatile RAM (NVRAM) or any other high-speed memory that can be adapted to cache data in the system 400.

The DD 404C can include a hard disk drive (HDD), an enhanced integrated drive electronics (EIDE) drive, a solid-state drive (SSD), a serial advanced technology attachments (SATA) drive, or an optical disk drive (ODD). The DD 404C can be arranged for external use in a suitable chassis (not shown). The DD 404C can be connected to the bus 401 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications. The DD 404C can include the identification unit or Blob Detection and Prediction (BDP) stack 410. The DD 404C can be arranged to store data relating to instantiated processes (including, for example, instantiated process name, instantiated process identification number and instantiated process canonical path), process instantiation verification data (including, for example, process name, identification number and canonical path), timestamps, or notifications.

The database (DB) 404D can be arranged to store the captured ultrasound images of the pipe and one or more training datasets for the identification unit 408 or BDP stack 410. The DB 404D can include a record for each crack, blob, or section of pipe scanned by the crawler 300. The DB 404D can be arranged to be accessed by any of the components in the system 400. The DB 404D can be arranged to receive queries and, in response, retrieve specific records or portions of records based on the queries. The DB 404D can include a DBMS that can interact with the components in the system 400. The DBMS can include, for example, SQL, MySQL, Oracle, Postgres, Access, or Unix. The DB 404D can include a relational database.

One or more computing resources can be stored in the storage 404, including, for example, an operating system (OS), an application program, an API, a program module, or program data. The computing resource can include an API such as, for example, a web API, a SOAP API, an RPC API, a REST API, or any other utility or service API. One or more of the computing resources can be cached in the RAM 404B as executable sections of computer program code or retrievable data.

The IO interface 407 can receive commands or data from an operator. The IO interface 407 can be arranged to connect to or communicate with one or more input-output devices (not shown), including, for example, a keyboard (not shown), a mouse (not shown), a pointer (not shown), a microphone (not shown), a speaker (not shown), or a display (not shown). The IO interface 407 can include a human-machine-interface (HMI). The received commands or data can be forwarded from the IO interface 407 as instruction or data signals via the bus 401 to any computer resource asset in the system 100.

The driver unit 409 can include an audio driver 409A and a video driver 409B. The audio driver 409A can include a sound card, a sound driver (not shown), an interactive voice response (IVR) unit, or any other device necessary to render a sound signal on a sound production device (not shown), such as for example, a speaker (not shown). The video driver 409B can include a video card (not shown), a graphics driver (not shown), a video adaptor (not shown), or any other device necessary to render an image signal on a display device (not shown).

The computer vision unit 406, which in an embodiment of the system 400 comprises a computer vision process or program running on the processor 402, is configured to begin the preprocessing by digitizing the captured ultrasound images 200, thereby enabling precise calculations to be made on a digital computer using time- and pipe surface position-indexed digital representations of crack and other defect 201 geometry as inputs. The resulting digitized images constitute high-resolution presentations of all cracks, flaws, stress concentrations and other defects that are detectable by the visual acuity of the ultrasound scanner used. The computer vision unit 406 is configured to scan each digitized ultrasound image to identify all cracks and other flaws within the image. The computer vision unit 406 can include any suitable algorithm to perform the crack detection within the digitized ultrasound images, including, without limitation, a convolutional neural networks (CNN) or deep convolutional neural network (DCNN).

The process identifies each crack and associates the identified crack with a unique identifier, in step 108. In this regard, the identification unit 408 can be arranged to identify each crack with the unique identifier. The identification unit 408 can include a machine learning platform or algorithm, such as, for example, a neural network. Step 108 can be implemented in a system embodiment as a process or program running on the processor 402, wherein each identified crack is 201 associated by computer executable code executing in the processor 402 with a unique identifier, which is used to track individual cracks 201 as they propagate. The identifiers can be stored in the memory 404 and referenced by the identification unit 408 during crack identification and association, in step 108. The time and space history of an individual crack's propagation can be its life cycle. The history of each crack and its propagation can be stored as one or more records or files in the memory 404, for example, in the DB 404D. Data describing the time and space history or life cycle of a crack can be included in the records or files and remain associated throughout the method with its assigned unique identifier, allowing the calculation of multiple determined parameters describing the progression of the crack. A dictionary of chronologically sorted unique identifiers and associated crack data is maintained by the processor 402, such as within the memory 404, and it provides each individual crack's life cycle, which can be used to train the system according to the disclosure to make predictions of crack propagation.

Figure 2C:
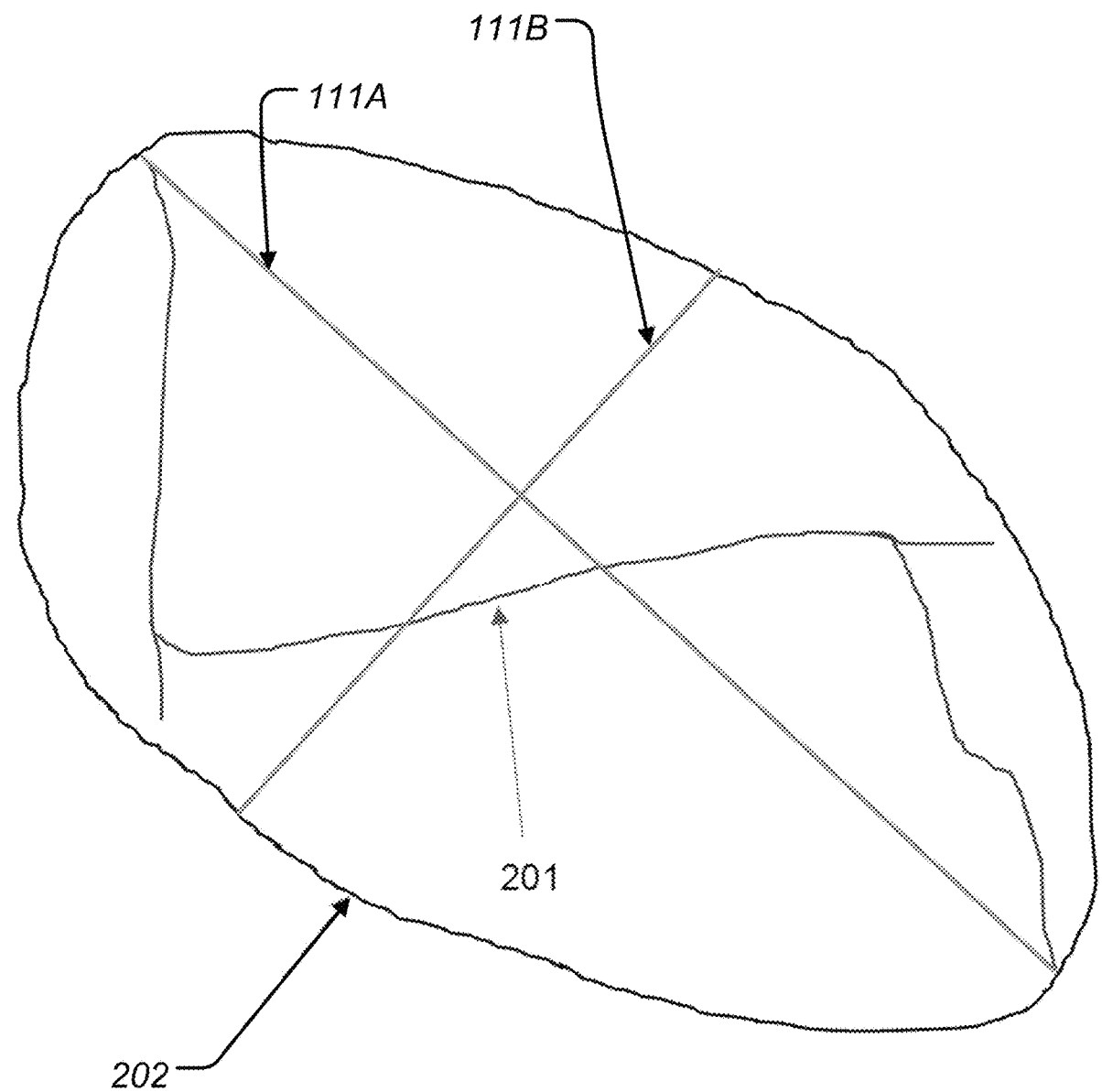
FIG. 2C illustrates an exemplary blob defined by the principal axis dimensions of an included crack.

Following the association of each crack with a respective unique identifier (step 108), the computer vision unit 406 can interact with the BDP stack 410 so the system 400 can estimate, in step 109, the size of each of the identified cracks, one of which is shown in FIG. 2C. For instance, the blob detection unit 412 can identify each blob comprising groups of cracks. In this non-limiting example, the crack 201 has led to the formation of an area of stress concentration—that is, blob 202—whose boundaries are also shown in FIG. 2C. The computer vision unit 406 (or BDP stack 410) can identify a pair of perpendicular, principal axes that each correspond to the greatest linear extent and greatest lateral extent, respectively, of each crack. The greatest linear extent 111A is a dimension that is aligned with the single greatest dimension of the crack, typically a generally lengthwise direction. The greatest lateral extent 111B is the largest dimension of the crack on an axis perpendicular to the axis corresponding to the greatest linear extent. The crack dimensions along the principal axes 111A, 111B are important as they are used as inputs to a blob detection unit 412, which is described below.

With all cracks measured and tagged with a unique identifier that enables each to be tracked across time and space, the next step 112 is to identify each blob along the surface of the pipe under study. In this regard, the blob detection unit 412 can comprise a neural network or computer executable code executing in the processor 402 to identify blobs along the surface of the pipe under study, the step being implemented in a system embodiment as a process running on the processor 402. The field of blob detection is a specialized area of computer vision whose objective is the detection of regions in a digital image that differ in properties, such as brightness or color, compared to surrounding regions. Broadly defined, a blob can include a region within an image in which some properties are constant or nearly constant, with surrounding regions being differentiable so that the edges of the blob and hence its boundaries and extent can be defined. Consequently, all the points within the blob up to its boundaries tend to be correlated with each other in some way. In the case of crack detection, blobs are areas wherein individual cracks have led to detectable stress concentrations in the material. Blobs can also be areas that meet a prescribed likelihood of crack coalescence or crack cross-influence due to the proximity of the cracks. The blob detection unit 412 can be arranged to perform blob detection through convolution using, for example, a CNN or DCNN. The blob detection unit 412 can use, for example, Laplacian of Gaussian, Difference of Gaussian, and Determinant of Hessian to detect blobs in the image data.

For each individual crack 201 within an image, the blob detection unit 412 can use the previously-determined greatest linear extent 111A and greatest lateral extent 111B of the crack as an initial estimate of the shape and size of a corresponding blob 202 that includes the crack 201. The blob detection unit 412 can then iterate about the initial estimate of the blob edge, corresponding to a bounding polygon defined by the axes 111A, 111B, until it converges upon a solution that matches one or more true dimensions of the blob. In this regard, the blob detection unit 412 can run iteratively and produce successively better approximations of the dimensions of the blob with each iteration. The blob detection unit 412 can stop when, for example, either a maximum number of iterations have been run or the change in calculated values between iterations is small, such as, for example, about 0.1% or about 1 mm. The conditions for the blob detection unit 412 can be specified by, for example, a user via the IO interface 407 based on their knowledge or experience. It is desirable to specify both conditions and stop the process when either condition has been fulfilled. This can be done to prevent numerical methods from running infinitely. For any one or more of the blob detection methods that are selected or implemented in the blob detection unit 412, the predictive efficacy of the disclosed method can be further enhanced by iteratively varying the parameters and weights used as inputs to the blob detection unit 412 until a desired degree of numerical agreement is achieved between crack propagation predictions and measured crack data. For instance, the numerical agreement might be a correlation between the predicted and measured data within a prescribed range of sizes, rates of growth, or another crack parameter.

After all blobs within each image have been identified (step 112), the next step 114 can be performed to identify a center on each blob by, for example, the center determination unit 414, and parametrize the location of the identified center by, for example, the parametrizer unit 420. The step 114 can be implemented by the center determination unit 414 and parametrizer unit 420, or in a system embodiment as a process running on the processor 402, using the time- and position-indexed images to parametrize the location of a center of each identified blob as a function of time. The blob detection unit 412 can be configured to interact with the blob determiner 413 to determine a weighted center of the blob (for example, determined by the center determination unit 414) based upon the points of highest apparent stress concentration, or a geometric or absolute center, determined as that point where all radii to the edges of the blob are closest to being equal (for example, determined by the radii determination unit 416). The result of this process is the determination of a function for each blob that describes the position of the blob center as a function of time.

In the following step 116, a radial extent of each blob can be parametrized as a function of time relative to the center of each blob. In this regard, the parametrizer unit 420 can interact with the center determination unit 414 or radii determination unit 416 to parametrize a radial extent of each blob as a function of time relative to the center of each blob. Step 116 can be implemented in a system embodiment as a process running on the processor 402, which can use the same digitized image data to parametrize a radial extent of each blob as a function of time and relative to the center of each blob. To express the blob edge position or radial extent relative to the center of each blob, a reference axis and direction must be defined, which in an embodiment can be an axis along the pipe surface running through the blob center and parallel to the centerline of the pipe, and having a specified direction as being either in an upstream or downstream direction. This allows the radial extent of any blob to be fully described as a function of a variable radius, each radius being associated with an angular displacement relative to the reference axis and direction. As cracks progress through their respective life cycles, leading to changes in blob geometry, the centers and radial extents of all blobs as a function of time and position can be determined by, for example, the center determination unit 414 and radii determination unit 416.

In the next step 118 of the method, each parametrized blob location and radial extent can be correlated, for example, by the parity relationship determination unit 418, to determine parity relationships for each blob from a first captured image to a next captured image. Step 118 can be implemented in a system embodiment as a process running on the processor 402, such as, for example, a computer vision algorithm (for example, CNN or DCNN), to correlate the parametrized blob locations and radial extents to determine parity relationships for each blob in a blob progression from one digital data set from a first captured image to a next digital data set from a next captured image over a blob life cycle. The parity relationship determination unit 418, or the process executed on the processor 402, can be encoded to recognize associations between images of individual cracks and blobs in the time-lapsed series of images, and as each individual crack and blob is associated across successive images, the unique identifiers that were associated with each blob in step 108 of the disclosed method are harmonized. This means that the unique identifier that was associated with a crack at the time of its first identification is also associated with images of the same propagated crack at later points in time shown in later images, overwriting in the dictionary any unique identifier that was applied before images of the same crack were correlated across various points in time. Cracks which were not present in the earliest-captured images will also have each of their unique identifiers associated with images of the same propagated crack at later points in time shown in later-captured images.

Upon completion of the correlations of respective blob locations and radial extents across points in time, the disclosed method has now compiled a complete time history of the progression and growth of respective blobs as a function of time and position. In an embodiment of the disclosure, the determined parity relationships of one or more of the blobs can be provided to a visualization program in the blob determiner 413, enabling the blob determiner 413 to predict or generate static or time-lapsed images of the blob as it propagates along the surface of the pipe. In a further embodiment of the disclosure, the determined parity relationships of one or more blobs can be used to generate and present a summary of all blob parametric data, including blob center translational history, blob radial extents as a function of time and position, and propagation rates of the blob over its life cycle.

The parity relationships describing (or predicting) the progression and growth of respective blobs across the surface of the pipe can be used in step 120 of the disclosure, in which the determined parity relationships can be used by the blob determiner 413 to determine blob characteristics for each blob, including, for example, a defect area ratio, the gross number of cracks, and a crack propagation rate (for example, in millimeters (mm) per second (s)—mm/s). Step 120 can be implemented in a system embodiment as a process running on the processor 402, which can be configured to determine other characteristics that describe the condition of the pipe under study. One characteristic (or parameter), the defect area ratio, can be determined on a time-lapsed basis by first using the parametrized blob geometric parameters (for example, generated by the parametrizer unit 420) to calculate respective blob areas as a function of time, and then dividing the aggregate area of all blobs present within the area of pipe under study by the total surface area of that section of pipe. The defect area ratio provides an indication as to the degree to which a given section of pipe under study is structurally compromised. The gross number of cracks present within the section of pipe under study can also be tabulated by conducting an inventory of all unique identifiers that have been associated with cracks on the pipe, and it is a measure that provides further indication of the amount of damage present. Crack propagation rates can be calculated using the complete time history of the progression and growth of respective blobs as a function of time and position that has been compiled. Knowledge of the rates at which cracks within the pipe surface are spreading will provide enterprise management with an indication of the urgency with which remediation measures must be taken.

The determined parity relationships can also be used in step 122, in which parameters for the blob identification and prediction model provided by the BDP stack 410 can be tuned or updated, or a training dataset created or updated, or used to update or create training datasets that can be used to train the system implementing the method to generate and output a prediction of the propagation of cracks or blobs along the pipe. Once trained the system can include several distinct procedures, including, for example: i) inputting relevant data comprising a plurality of ultrasound images of a surface of a pipe; ii) performing the processing steps (shown in FIG. 1) on the image data to detect cracks, defects or blobs and carry out crack identification, blob detection and parameterization of the blob locations and extents as a function of time, as described at steps 104 through 116; iii) determining correlations to determine the parity relationships for each given blob across a set of captured images. This enables the system to model and store a set of representative microstructures containing specific defects, which it can use to generate and render simulations of predicted crack and blob formations, from beginning through end of life cycle.

In a non-limiting embodiment, the system 400 can detect, identify and model defects, cracks or crack formations on a pipe structure. The system 400 can provide rapid detection, analysis and prediction of blobs, including defects or cracks that have resulted or can result in stress concentrations in the structure material. The system 400 can be arranged to detect, identify and model a blob over its life cycle, beginning from the emergence of a defect or crack at a specific location to any arbitrary subsequent time of measurement up to and including a possible structural failure that is attributable to the defect or crack in question. The system 400 can model, for example, repeated cyclic loads that can undermine the microscopic lattice of the structure in question, as well as further loadings that often cause the first nascent cracks to appear. The system 400 can model the crack as it forms, as well as its natural point of stress concentration that, for example, continued loading will cause to propagate and further undermine the structure in question, resulting in a blob, which can include a detectable manifestations of damage. The system 400 can detect or predict a blob that can form when agglomerations of individual cracks begin to coalesce into larger fields of compromised structural material, making sudden catastrophic failure likely and underscoring the importance of the system, including real-time tracking and prediction of crack propagation. The system 400 can be arranged to learn by validation or backward propagation.

The system 400 can be trained using a dataset having a large number of images in which each crack or blob is identified and labelled. The training dataset can include, for example, scans that are produced as the result of carefully conducted laboratory experiments in order to induce the desired defect, crack or blob type to be studied. The scans can then be labelled with annotations for both the damaged areas and the undamaged, "healthy" areas. For the damaged areas, there can be further sub-classification to specify the type of defect, crack or blob identified, as well as its location, size, shape, spatial orientation as a function of time.

In a non-limiting example, the training dataset for the system 400 can be created by building a large database of, for example, hundreds, thousands, or millions of scans of damaged and healthy pipe structures, identifying and classifying each crack or blob in the scans and annotating the scans accordingly. Once each crack or blob in a scan has been identified and classified, it can be individually indexed and parametrized. For instance, an identified blob in a scan can have its center pinpointed and its radial extents measured as a function of direction and length. Successive scans of a region captured over time can be geometrically correlated and parity relationships can be determined and annotated for each individual crack or blob from one scan to the next, thereby allowing tracking of each crack's or blob's development over time. The annotated scans can be used to train the system 400 to parametrize crack or blob propagation over time, taking into consideration factors, such as, for example, location, shape, or dimensions of a crack, type of crack, proximity or likelihood of merger between two or more cracks or blobs, or the pipe material conditions.

In addition to the input parameters provided to the training system, the training system generates internal parameters as a result of certain processing of the stored data in order to model the defects including cracks. The internal parameters can be used to initialize and configure the blob detection unit 412. The parameters can include, among other internal parameters, a selection from among: the identified cracks, the identification of blobs comprising groups of cracks, the parametrization of the location of the center of each blob, such parameterization being identified as a function of time with respect to the set of ultrasound images, a parametrization of the radial extent of each blob, again both as in regard to the center of each blob and as a function of time with respect to the set of ultrasound images, and a correlation of the parameterized blob locations and radial extents.

The stored data thus can comprise data from the captured images and data from processing the images, and this information can be used to tune the model in the system 400 or to generate a database which can be stored, such as in the memory 404. In one implementation in accordance with the disclosure, the database includes a number (N) of models of small structural elements, referred to herein as microstructures, each microstructure having specific parameters and at least one integrated defect. The number (N) can also be controlled by the operator through control over increment sizes, such as the size of the defects. In some implementations, the microstructures can be modeled as an ellipsoid, but more generally each microstructure, or blob as an aggregate of localized microstructures can be considered a representative volume element (RVE). Each RVE can be parameterized as a vector of a plurality of elements, which in a non-limiting example can include eight elements $V_k$ [$a_k$, $b_k$, $c_k$, $z_k$, $\theta_k$, $\varphi_k$, $D_k$, $M_k$], where $z_k$ is the coordinate of the defect centroid in the out-of-plane direction (perpendicular to the inspection plane) in the kth RVE, $a_k$, $b_k$ and $c_k$ are the spatial dimensions of the defect within the kth RVE, $\theta_k$ and $\varphi_k$ are the angles between the plane of the defect and the inspection plane from which the ultrasound image was captured, $D_k$ is the defect type, and $M_k$ is the type of media entrapped within the defect, if known. For instance, the entrapped media can be air. While the model simplifies the geometry of defects to some extent, the large number and variation in location, sizes, defect types and entrapped media generated in practice cover and suitably represent typical defects that occur in composite structures.

As noted previously, at step 120, the determined relationships can further be used to determine defect area ratios, gross numbers of cracks and crack propagation rates, all of which are processed by the model configured to determine parity relationships for each blob, over time, from a first captured image to a successive (e.g., next) captured image in time. For instance, the changes in a first RVE in its size, extent, or both, relative to a second RVE can inform the model of crack propagation and crack propagation rate.

As such, the time and space histories of the respective blobs that have been compiled by the present disclosure allow the system 400, including machine learning processes, to process the compiled historical data, which comprises the training data, and derive the correlations that govern the propagation of cracks along the subject pipe. As understood by those of skill in the art, the machine learning can predict crack propagation by taking account of the boundaries of the RVEs and other data in the memory 404 in order to solve a set of partial differential equations configured in accordance with the model. A system embodiment of the disclosure can have the machine learning process(es) running on the processor 402. In an embodiment of the disclosure, the machine learning process(es) can comprise using an algorithm to process the training data. The machine learning process(es) can comprise training a neural network using the training data.

The invention encompassed by the present disclosure has been described with reference to the accompanying drawings, which form a part hereof, and which show, by way of illustration, example implementations and/or embodiments. As such, the figures and examples above are not meant to limit the scope of the present application to a single implementation, as other implementations are possible by way of interchange of some or all of the described or illustrated elements, without departing from the spirit of the present disclosure. Among other things, for example, the disclosed subject matter can be embodied as methods, devices, components, or systems.

It is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a network. The backbone can include an Ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communicating device," as used in this disclosure, means any computing device, hardware, or computing resource that can transmit or receive data packets, instruction signals or data signals over a communication link. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (X), a central processing unit (CPU), a graphic processing unit (GPU), an application specific integrated circuit (ASIC), a compute core, a compute machine, a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The terms "computer resource asset" or "computing resource asset," as used in this disclosure, means a computing resource, a computing device or a communicating device, or any combination thereof.

The term "computer-readable medium" or "computer-readable storage medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "computing resource," as used in this disclosure, means software, a software application, a web application, a web page, a computer application, a computer program, computer code, machine executable instructions, firmware, or a process that can be arranged to execute on a computing device or a communicating device.

The terms "connectivity" or "connectivity link," as used in this disclosure, means a communication link or any combination of communication links that connects two or more nodes, carrying data packets between the nodes. A data packet can include an Internet Protocol (IP) data packet. A data packet can include an instruction signal that, when received by a communicating device can cause the device to carry out a predetermined function or task. The data packet can include a data packet signal that, when received by a communicating device can be implemented in carrying out a predetermined function or task, or processed to render information.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "device" or "equipment," as used in this disclosure, means any structure, thing or article that can be arranged, adapted, configured or made for a particular purpose or to perform a particular task, function or operation.

The terms "including," "comprising" and variations thereof, as used in this disclosure, mean "including, but not limited to," unless expressly specified otherwise.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While various implementations of the present application have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the invention is to be understood as being defined by the recitations in the claims which follow and structural and functional equivalents of the features and steps in those recitations.

What is claimed:

1. A computer-based method for predicting the propagation of cracks along a pipe, the method comprising:

capturing a plurality of ultrasound images of at least one area of interest on a surface of the pipe, wherein each image is indexed to a position and time of the image capture;

preprocessing the captured images using a computer vision algorithm, wherein the preprocessing operates on digitized data defined from each captured image and wherein the algorithm is configured to identify defects in the pipe, including cracks, based on the preprocessing of the digitized data;

associating each identified crack with a unique identifier to be used to track individual cracks;

identifying blobs within the digitized data defined from each captured image using at least one blob detection module, the blobs comprising groups of cracks that are correlated by the blob detection module as having detectable areas of stress concentration or a prescribed likelihood of crack coalescence or crack cross-influence;

parametrizing a location of a center of each identified blob as a function of time;

parametrizing a radial extent of each blob as a function of time relative to the center of each blob;

correlating the parametrized blob locations and radial extents to determine parity relationships for each blob from one digital data set from a first captured image to a next digital data set from a next captured image over a blob life cycle;

using the determined parity relationships to determine defect area ratio, the gross number of cracks, and crack propagation rates; and using a machine learning process and the determined parity relationships as training data to train a system implementing the method to predict the propagation of cracks along the pipe.

2. The method as is claim 1, wherein the preprocessing step further comprises:

using a computer vision algorithm to estimate a size of each of the identified cracks, the size being defined by a pair of perpendicular, principal axes corresponding to a greatest linear extent and a greatest lateral extent of each crack, wherein the greatest linear extent is a dimension equal to a single greatest linear dimension of the crack, and wherein the greatest lateral extent is a greatest dimension of the crack on an axis perpendicular to the axis corresponding to the greatest linear extent.

3. The method as in claim 2, wherein the identifying step further comprises:

using the at least one blob detection module with each respective greatest linear extent and each respective greatest lateral extent as an initial estimate of the shape and size of each respective blob edge that includes each respective crack, iterating about the initial estimate of the blob edge, corresponding to a bounding polygon defined by the greatest linear extent and the greatest lateral extent, until a convergence upon a solution that matches a true dimension of the blob.

4. The method as in claim 1, wherein the machine learning process comprises using an algorithm to process the training data.

5. The method as in claim 1, wherein the machine learning process comprises training a neural network using the training data.

6. The method as in claim 1, wherein the at least one blob detection module implements blob detection methods selected from the group consisting of: Laplacian of Gaussian, Difference of Gaussian, and Determinant of Hessian.

7. The method as in claim 6, further comprising iteratively varying the parameters and weights used as inputs to the at least one blob detection module until a desired degree of agreement is achieved between crack propagation predictions and measured crack data.

8. The method as in claim 1, further comprising providing the determined parity relationships of at least one blob to a visualization program to generate detailed static or time-lapsed images of the blob.

9. The method as in claim 1, further comprising using the determined parity relationships of at least one blob to generate and present a summary of all blob parametric data, comprising: blob center translational history, blob radial extents as a function of time and position, and propagation rates of the blob over its life cycle.

10. A system for predicting the propagation of cracks along a pipe, the system comprising:

at least one processor connected to at least one memory;

a computer vision algorithm running on the processor configured to preprocess a plurality of captured ultrasound images of at least one area of interest on a surface of the pipe, each image being indexed to a position and time of the image capture, wherein the preprocessing operates on digitized data defined from each captured image and wherein the algorithm is configured to identify defects in the pipe, including cracks, based on the preprocessing of the digitized data;

a process running on the processor configured to associate each identified crack with a unique identifier to be used to track individual cracks;

at least one blob detection module running on the processor, the blob detection module configured to identify blobs within the digitized data defined from each captured image, the blobs comprising groups of cracks that are correlated by the blob detection module as having detectable areas of stress concentration or a prescribed likelihood of crack coalescence or crack cross-influence;

a process running on the processor configured to parametrize the location of a center of each identified blob as a function of time;

a process running on the processor configured to parametrize a radial extent of each blob as a function of time relative to the center of each blob;

a process running on the processor configured to correlate the parametrized blob locations and radial extents to determine parity relationships for each blob from one digital data set from a first captured image to a next digital data set from a next captured image over a blob life cycle;

a process running on the processor configured to use the determined parity relationships to determine defect area ratio, the gross number of cracks, and crack propagation rates; and wherein the system is trained using a machine learning process and the determined parity relationships as training data to enable the system to predict the propagation of cracks along the pipe.

11. The system as is claim 10, wherein the computer vision algorithm is further configured to estimate a size of each of the identified cracks, the size being defined by a pair of perpendicular, principal axes corresponding to a greatest linear extent and a greatest lateral extent of each crack, wherein the greatest linear extent is a dimension equal to a single greatest linear dimension of the crack, and the greatest lateral extent is a greatest dimension of the crack on an axis perpendicular to the axis corresponding to the greatest linear extent.

12. The system as in claim 11, wherein the at least one blob detection module is further configured to use each respective greatest linear extent and each respective greatest lateral extent as an initial estimate of the shape and size of each respective blob edge that includes each respective crack by iterating about the initial estimate of the blob edge, corresponding to a bounding polygon defined by the greatest linear extent and the greatest lateral extent, until a convergence upon a solution that matches a true dimension of the blob.

13. The system as in claim 10, wherein the machine learning process comprises using an algorithm running on the processor to process the training data.

14. The system as in claim 10, further comprising a neural network, wherein the machine learning process comprises training the neural network using the training data.

15. The system as in claim 10, wherein the at least one blob detection module implements blob detection methods selected from the group consisting of: Laplacian of Gaussian, Difference of Gaussian, and Determinant of Hessian.

16. The system as in claim 15, further comprising a process running on the processor configured to iteratively vary the parameters and weights used as inputs to the at least one blob detection module until a desired degree of agreement is achieved between crack propagation predictions and measured crack data.

17. The system as in claim 10, further comprising a visualization program running on the processor configured to generate detailed static or time-lapsed images of at least one blob using the determined parity relationships for the blob as input.

18. The system as in claim 10, further comprising a process running on the processor configured to use the determined parity relationships of at least on blob to generate and present a summary of all blob parametric data, comprising: blob center translational history, blob radial extents as a function of time and position, and propagation rates of the blob over its life cycle.

* * * * *